United States Patent [19]
Marvin

[11] 3,851,121
[45] Nov. 26, 1974

[54] AUTOMATIC REMOTE SERVICE MONITORING SYSTEM

[75] Inventor: Howard Arthur Marvin, Claremont, Calif.

[73] Assignee: General Telephone Company of California, Santa Monica, Calif.

[22] Filed: Dec. 10, 1973

[21] Appl. No.: 423,282

[52] U.S. Cl. .................... 179/175.2 C, 179/1 MN
[51] Int. Cl. .................... H04m 3/22
[58] Field of Search.... 179/175.2 C, 175.2 R, 1 MN

[56] References Cited

UNITED STATES PATENTS

| | | | |
|---|---|---|---|
| 1,641,453 | 9/1927 | Ostline | 179/175.2 C |
| 1,691,554 | 11/1928 | Saville | 179/175.2 C |
| 3,704,348 | 11/1972 | McIntosh et al. | 179/175.2 C |

OTHER PUBLICATIONS

"Centralized Service Observation" by J. D. Flamini, Jr., Automatic Electric Technical Journal, Jan. 1971, pp. 190–196.

*Primary Examiner*—Kathleen H. Claffy
*Assistant Examiner*—Douglas W. Olms
*Attorney, Agent, or Firm*—Pastoriza & Kelly

[57] ABSTRACT

Rather than have a telephone central office supervisor monitor incoming telephone calls from customers to a remote division office, an automatic monitoring of such calls at the central office is effected by providing tape recorders. OFF and ON tone control signals are generated by an incoming call detector at a remote division office and transmitted to the central office for automatically actuating the tape recorders so that telephone calls between customers and service personnel at the remote office are automatically recorded at the central office for subsequent review.

5 Claims, 1 Drawing Figure

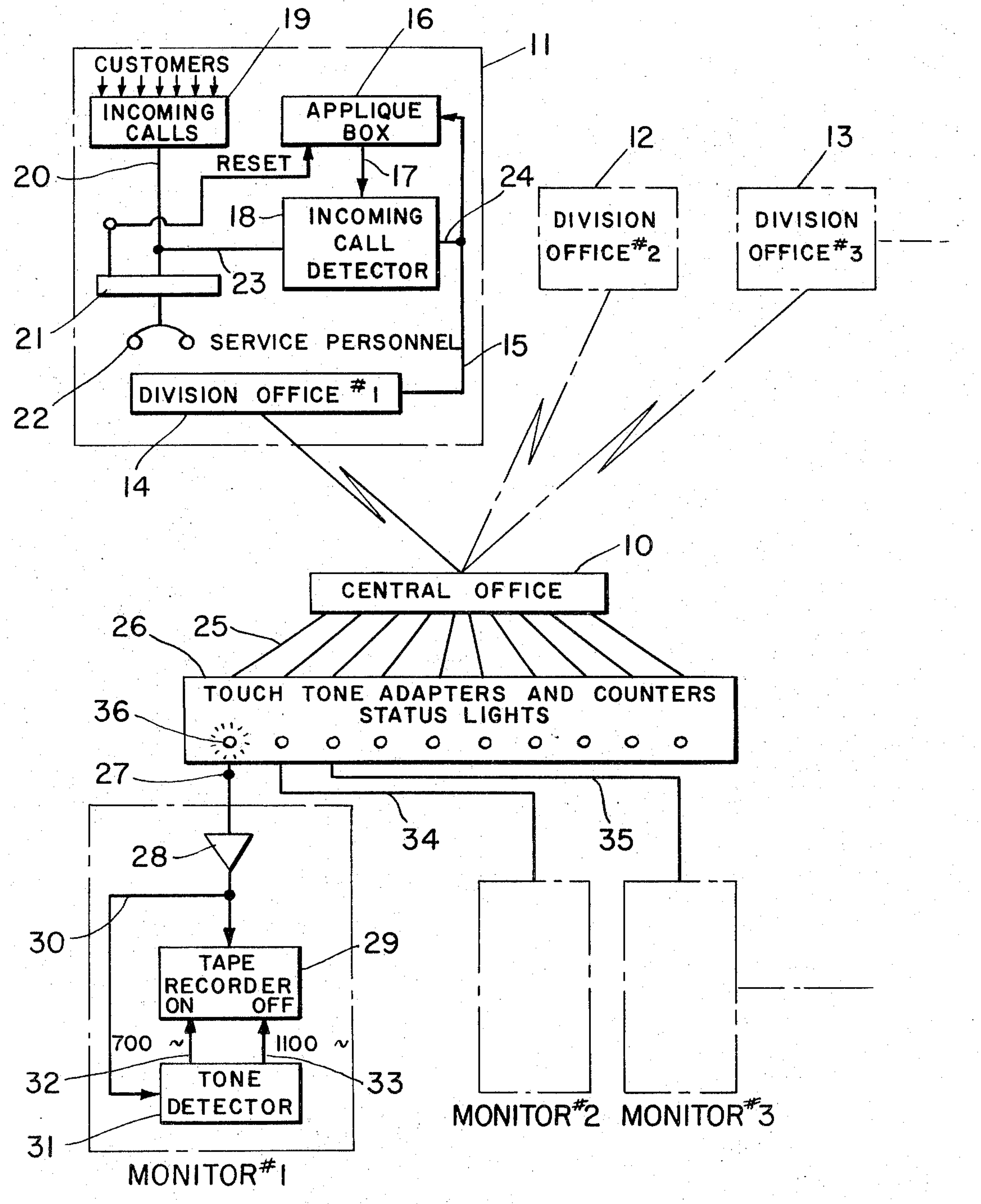
CUSTOMERS
INCOMING CALLS
APPLIQUE BOX
RESET
INCOMING CALL DETECTOR
SERVICE PERSONNEL
DIVISION OFFICE #1
DIVISION OFFICE #2
DIVISION OFFICE #3
CENTRAL OFFICE
TOUCH TONE ADAPTERS AND COUNTERS
STATUS LIGHTS
TAPE RECORDER
ON OFF
700 ~
1100 ~
TONE DETECTOR
MONITOR #1
MONITOR #2
MONITOR #3
10 11 12 13 14 15 16 17 18 19 20 21 22 23 24 25 26 27 28 29 30 31 32 33 34 35 36

AUTOMATIC REMOTE SERVICE MONITORING SYSTEM

This invention relates generally to telephone operations and more particularly to a method and system for automatically monitoring at a central office telephone calls between customers and service personnel at remote division offices.

BACKGROUND OF THE INVENTION

In order to maintain high quality telephone service between service personnel and customers, it is common practice for the telephone company to periodically monitor incoming service calls at remote division offices from customers to division personnel at the division offices.

Presently existing equipment for carrying out the foregoing comprises suitable means for an operator at a central office to dial out to any one or more selected remote division office and tap into incoming call lines so that the operator at the central office or supervisory personnel at the central office can listen in to conversations between customers and service personnel at the remote division office. While this system is effective in properly controlling the quality of service rendered to customers, it requires the presence of one or more telephone operators or supervisory personnel at the central office to "listen in" to the telephone conversations at the remote division offices. The central office personnel do not know when a customer call to a division office might take place. As a result, much of an operator's time is wasted while awaiting an incoming call at the remote division office which can be monitored.

BRIEF DESCRIPTION OF THE PRESENT INVENTION

With the foregoing in mind, the present invention contemplates a method and system for automatically monitoring at a central office incoming telephone calls from customers to service personnel at remote division offices all to the end that it is not necessary to have special operators or supervisory personnel at the central office constantly at a telephone for the purpose of such monitoring.

More particularly, in accord with the invention, an enabling code is generated at the central office and sent over a dialed-out telephone line to one or more selected remote division offices. Means are provided at the division offices for intercepting and utilizing the enabling code to initiate operation of an incoming call detector. This incoming call detector will automatically intercept any incoming customer calls to service personnel at the particular division office. In addition, the call detector generates ON and OFF tone control signals which are transmitted back with the intercepted telephone call to the central office.

At the central office there are provided one or more tape recorders, depending upon the number of division offices to be monitored. These tape recorders are automatically turned on and off in accord with the ON and OFF tone control signals received from any one division office so that the incoming telephone calls are automatically recorded on the tape recorder. Telephone personnel at the central office can then subsequently play back the tape recorders and thus monitor all of the calls in a convenient manner and at a convenient time.

BRIEF DESCRIPTION OF THE DRAWING

A better understanding of this invention will be had by referring to the accompanying drawing in which the single FIGURE consitutes a schematic block diagram useful in explaining the method and system of the invention.

DETAILED DESCRIPTION OF THE INVENTION

Referring to the drawing, there is indicated by the block at the center a central office 10 from which telephone lines run to various division offices, such as indicated at 11, 12, and 13. Each of the division offices includes essentially the same equipment and therefore a detailed description of one will suffice for all.

Thus, referring to the division office 11 there is provided an incoming switchboard designated 14 responsive to a dialed-in telephone call from the central office to pass an enabling signal code on a line 15 to an applique box 16. The applique box 16 is connected as by line 17 to an incoming call detector 18. The enabling code received in the applique box 16 is converted into a signal for initiating operation of the incoming call detector 18.

At the upper left portion in the drawing, there is indicated at 19, an incoming call switchboard which handles incoming calls from various, different customers who may require service from the division office. These incoming calls are passed through a line 20 to an operator's console 21 which might include one or more telephones handled by service personnel such as indicated at 22. The incoming call line 20 is tapped as by a lead 23 to be intercepted by the incoming call detector 18. This incoming call is transmitted back through a line 24 and the telephone line 15 to the central office 10 wherein it may be detected on a line 25 and passed through suitable receiver means indicated by the block 26. The telephone call itself is available at an output junction point 27.

Prior to the present invention, it has been common practice for a telephone operator or supervisor at the central office to dial out to a division office and intercept incoming calls from customers to service personnel at the division office. In this situation, the operator or supervisor would simply listen to the call at the junction point 27 and thus would constantly be tied to this particular location awaiting incoming calls which were to be monitored.

In accord with the present invention, rather than waste the time of an operator or supervisor listening in at the junction point 27, there is provided an automatic monitoring means for essentially recording the conversation at the junction point 27.

In the drawing, this monitoring means is enclosed within the dashed block designated monitor No. 1 and includes an amplifier 28 having its output passing to a tape recorder 29 and also through a branch lead 30 to a tone detector means 31. The tone detector means 31 provides ON and OFF tone control signals on output leads 32 and 33 for initiating and terminating operation of the tape recorder 29.

It will be noted that in addition to the lead 25 in the central office 10 to the receiver means 26 there is provided a plurality of additional leads to the receiver means. These additional leads connect respectively to a plurality of additional monitoring units designated monitor No. 2 and monitor No. 3 by way of example as by leads 34 and 35. These additional monitors include a plurality of additional tape recorders so that simultaneous monitoring of a plurality of remote division offices can take place.

The receiver means 26 which may house all of the monitors, also includes a plurality of status lights, one of which is indicated at 36 responsive to the tone signals to advise persons at the central office when an automatic monitoring is taking place. The unit 26 may also include counters associated with the respective monitors for counting the numer of telephone conversations recorded on the tape recorder. These counters would be made responsive to the ON and OFF tone control signals.

OPERATION

Most telephone company central offices and division offices already include an incoming call detector such as indicated at 18 for the division office No. 1. The central offices also include receiver means so that an operator or supervisor can monitor incoming customer calls to service personnel at the remote service station by tapping in at the junction point 27.

Thus, in the operation of the present invention, it is only necessary to add an applique box 16 at each of the division offices for controlling automatically the incoming call detector and a suitable amplifier, tone detector and tape recorder monitor unit to the junction point 27.

In operation, a touch tone system incorporated in the unit 26 is operated by an operator at the central office to send an enabling code to a division office. This enabling code as described is received at the division office in the switchboard 14 and passed through lead 15 to the applique box 16. The applique box is responsive to the enabling code to initiate operation of the incoming call detector 18.

When the incoming call detector 18 is initiated, it will automatically select the first incoming call from a customer to a servcie personnel at the division office and transmit this call back to the central office as described. Simultaneously, suitable ON and OFF tone control signals are provided by the applique box and passed with the intercepted incoming telephone calls by the incoming call detector 18 back to the central office. These ON and OFF tone control signals are then detected in the tone detector 31 to initiate operation of the tape recorder 29 so that the telephone conversation will be automatically recorded. At the termination of the conversation, the OFF tone control signal will terminate operation of the tape recorder so that no tape is wasted during the period of time between incoming customer calls at the remote division office. Also, the status light 36 will be energized and a counter will register a count for each telephone call.

If enabling signals are sent by the touch-tone adapters by the operator at the central office to other division offices such as 12 and 13 shown in the drawing, simultaneous and automatic monitoring of telephone calls at these division offices will take place in the corresponding monitor units at the central office.

In the preferred form of the invention, up to ten separate division offices can be simultaneously monitored.

In the event that a customer should not wish to have his incoming call recorded or the division office service personnel does not wish to have the call recorded, the applique box 16 can be reset by a reset line shown passing from the service personnel board 21 to the box. This reset signal will nullify the effect of the enabling code to the incoming call detector 18 so that the particular selected call will not be monitored. Before any further monitoring can take place, an enabling code must again be applied to the applique box from the central office.

From the foregoing description, it will thus be evident that the present invention has provided a useful method and system for automatically monitoring customer calls at remote division offices, all to the end that the quality of customer service can be improved. Thus, on playing back the tape recorders, supervisory personnel at the central office can criticize or otherwise formulate suggestions as to how remote service personnel can improve their relationships with customers. Further, and as stated heretofore, the entire monitoring operation can be carried out automatically for as many as ten different division offices without the requirement of the contstant attention of an operator or supervisor at the central office.

What is claimed is:

1. A method of automatically monitoring at a central office, service calls between customers and a remote division office, comprising the steps of:

a. generating at the central office an enabling code and sending it over a telephone line from the central office to the division office;
b. intercepting and utilizing said enabling code at the division office to initiate operation of an incoming call detector;
c. generating ON and OFF tone control signals at the division office in said incoming call detector indicating initiation and termination respectively of telephone calls between customers and service personnel at the division office, and passing said telephone calls and said tone control signals back to said central office;
d. receiving said telephone calls and tone control signals at said central office; and,
e. initiating and terminating operation of a tape recorder in response to receiving said ON and OFF tone control signals respectively at said central office whereby said telephone calls between customers and said division office are automatically recorded for subsequent review at said central office.

2. The method of claim 1, including the step of providing a plurality of additional tape recorders at said central office whereby a like plurality of additional division offices may be simultaneously monitored by passing the enabling code over telephone lines connecting from the central office to the additional division offices.

3. An automatic remote service monitoring system comprising, in combination:

a. means at a central office for generating and transmitting an enabling code to a remote division office;
b. applique box means at said division office receiving said enabling code and converting it to an initiating signal;
c. incoming call detector means connected to said applique box means and responsive to said enabling code to detect and transmit back to said central office telephone calls between customers and service personnel at said division office whenever such calls take place, said incoming call detector means including means for generating ON and OFF tone control signals indicating initiation and termination respectively of said incoming call and transmitting said ON and OFF tone control signals to said central office;

d. receiver means at said central office including tone detector means for receiving said telephone calls and said ON and OFF tone control signals; and, e. a tape recorder connected to said tone detector means and responsive to said ON and OFF tone control signals to start recording and stop recording respectively whereby said telephone calls are automatically recorded at said central office.

4. A system according to claim 3, including a plurality of additional receiver means and tape recorders at said central office whereby a plurality of additional division offices equipped similarly to said first mentioned division office may be monitored on tape by transmission of enabling codes to said additional division offices.

5. A system according to claim 4, in which said receiver means at said central office includes a status light indicator and counter-associated with each of the division offices being monitored, and responsive to the monitoring of telephone calls at the respective division offices whereby there is provided a visual indication of any division office being monitored and a count of the total number of incoming telephone calls received at said office.

* * * * *